US012593124B2

(12) United States Patent
Chen et al.

(10) Patent No.: US 12,593,124 B2
(45) Date of Patent: Mar. 31, 2026

(54) IMAGE ACQUISITION METHOD AND DEVICE

(71) Applicant: Lenovo (Beijing) Limited, Beijing (CN)

(72) Inventors: Zhichao Chen, Beijing (CN); Shanyao Lei, Beijing (CN); Zhuoran Xu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 122 days.

(21) Appl. No.: 18/467,981

(22) Filed: Sep. 15, 2023

(65) Prior Publication Data

US 2024/0147061 A1 May 2, 2024

(30) Foreign Application Priority Data

Oct. 27, 2022 (CN) .......................... 202211330198.0

(51) Int. Cl.
*H04N 23/667* (2023.01)
*H04N 23/63* (2023.01)
*H04N 23/71* (2023.01)

(52) U.S. Cl.
CPC ......... *H04N 23/667* (2023.01); *H04N 23/632* (2023.01); *H04N 23/71* (2023.01)

(58) Field of Classification Search
CPC ..... H04N 23/667; H04N 23/632; H04N 23/71
See application file for complete search history.

(56) References Cited

U.S. PATENT DOCUMENTS

2019/0109971 A1* 4/2019 Hashigami ............. H04N 23/72
2022/0174238 A1* 6/2022 Li ............................ H04N 5/91

FOREIGN PATENT DOCUMENTS

JP 2014217017 A * 11/2014 ............. H01L 27/14

OTHER PUBLICATIONS

"The Authoritative Dictionary of IEEE Standards Terms, Seventh Edition," in IEEE Std 100-2000 , vol. no., p. 700, Dec. 11, 2000, doi: 10.1109/IEEESTD.2000.322230. (Year: 2000).*

* cited by examiner

*Primary Examiner* — Timothy J Henn
(74) *Attorney, Agent, or Firm* — ANOVA LAW GROUP, PLLC

(57) ABSTRACT

An image acquisition method includes, in response to a target application being in a target operating mode, obtaining a first image by a target camera in a first operating mode and obtaining a second image by the target camera in a second operating mode. A resolution of the first image and a resolution of the second image are different.

15 Claims, 5 Drawing Sheets

If the target application is in the target operating mode, obtain the first image by the target camera in the first operating mode and the second image by the target camera in the second operating mode, the resolution of the first image and the resolution of the second image being different — S301

If the target camera is in the second operating mode, obtain an input operation, the resolution of the first image corresponding to the first operating mode being lower than the resolution of the second image corresponding to the second operating mode — S302

If the input operation satisfies the target operation, switch the target camera from the second operating mode to the first operating mode, the target operation causing the switching of the hardware cameras — S303

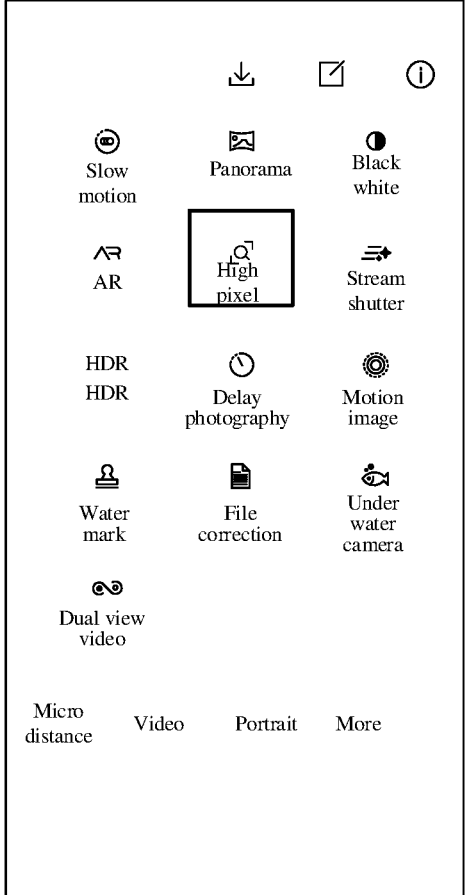
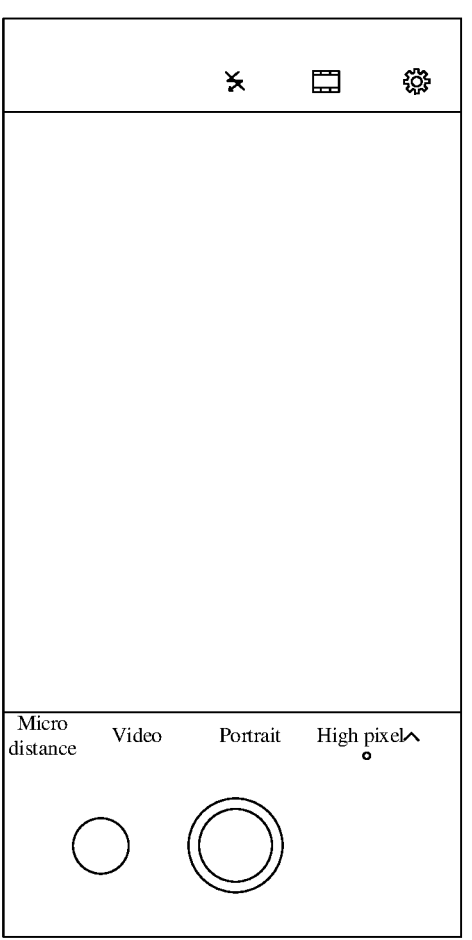
FIG. 1A
If a target application is in a target operating mode, obtain a first image based on a target camera in a first operating mode and a second image based on the target camera in a second operating mode. the first image and the second image having different resolutions — S101
FIG. 1B

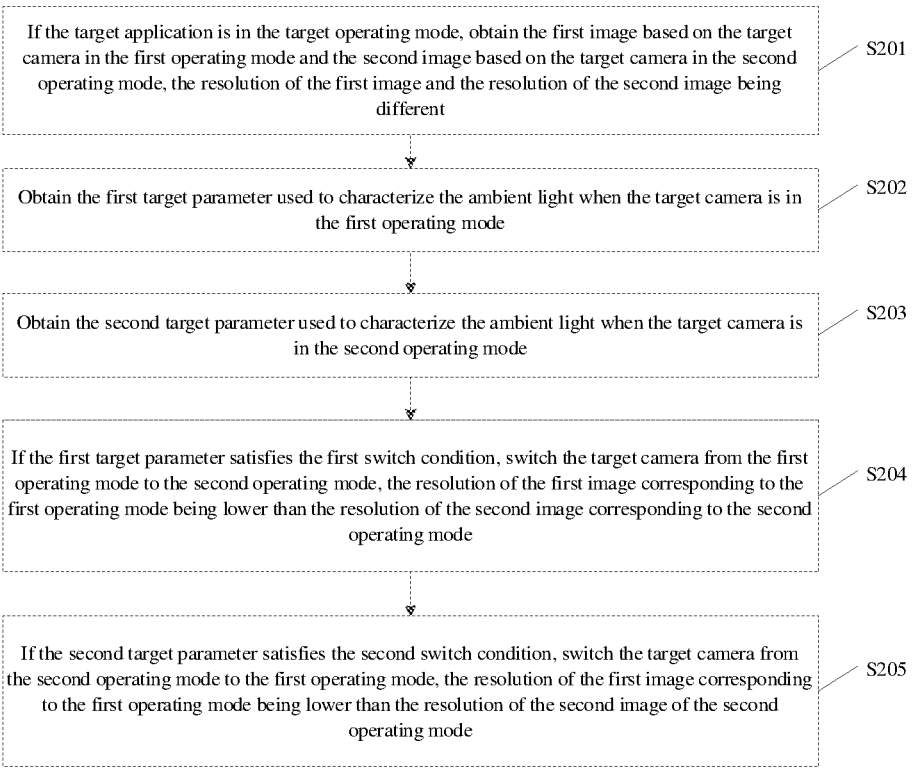

If the target application is in the target operating mode, obtain the first image based on the target camera in the first operating mode and the second image based on the target camera in the second operating mode, the resolution of the first image and the resolution of the second image being different — S201

Obtain the first target parameter used to characterize the ambient light when the target camera is in the first operating mode — S202

Obtain the second target parameter used to characterize the ambient light when the target camera is in the second operating mode — S203

If the first target parameter satisfies the first switch condition, switch the target camera from the first operating mode to the second operating mode, the resolution of the first image corresponding to the first operating mode being lower than the resolution of the second image corresponding to the second operating mode — S204

If the second target parameter satisfies the second switch condition, switch the target camera from the second operating mode to the first operating mode, the resolution of the first image corresponding to the first operating mode being lower than the resolution of the second image of the second operating mode — S205

FIG. 2A

IMAGE ACQUISITION METHOD AND DEVICE

CROSS-REFERENCE TO RELATED APPLICATION

The present disclosure claims priority to Chinese Patent Application No. 202211330198.0, filed on Oct. 27, 2022, the entire content of which is incorporated herein by reference.

TECHNICAL FIELD

The present disclosure relates to the electronic technology field and, more particularly, to an image acquisition method and a device.

BACKGROUND

With the development of technology, camera is essential for a mobile terminal. However, the user experience of photographing using the camera of the mobile terminal needs to be improved, and the utilization efficiency of the camera needs to be improved.

SUMMARY

Embodiments of the present disclosure provide an image acquisition method. The method includes, in response to a target application being in a target operating mode, obtaining a first image by a target camera in a first operating mode and obtaining a second image by the target camera in a second operating mode. The resolution of the first image and a resolution of the second image are different.

Embodiments of the present disclosure provide an image acquisition device including a processing unit. The processing unit is configured to obtain a first image based on a target camera in a first operating mode in response to a target application being in a target operating mode and obtaining a second image based on the target camera in a second operating mode. A resolution of the first image is different from a resolution of the second image.

Embodiments of the present disclosure provide a non-transitory computer-readable storage medium storing a computer program that, when called and executed by the processor, causes the processor to, in response to a target application being in a target operating mode, obtain a first image by a target camera in a first operating mode and obtain a second image by the target camera in a second operating mode. A resolution of the first image and a resolution of the second image are different.

BRIEF DESCRIPTION OF THE DRAWINGS

FIG. 1A illustrates a schematic diagram of image acquisition.

FIG. 1B illustrates a schematic flowchart of an image acquisition method according to some embodiments of the present disclosure.

FIG. 2A illustrates a schematic flowchart of an image acquisition method according to some embodiments of the present disclosure.

DETAILED DESCRIPTION OF THE EMBODIMENTS

Figure 2B:
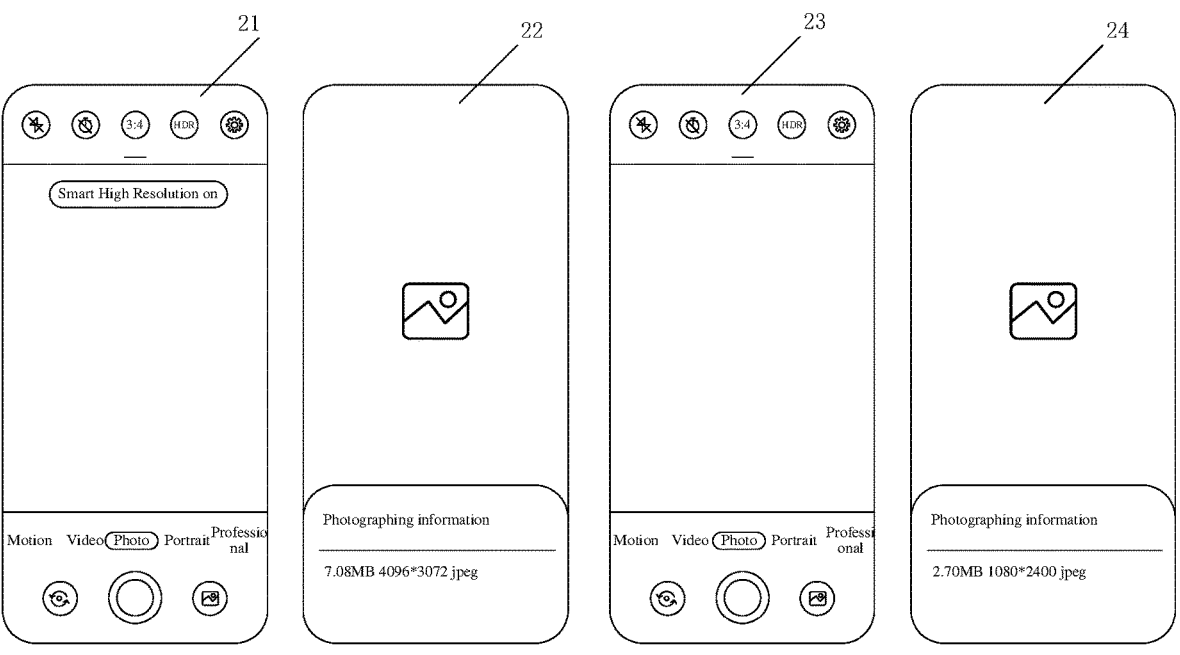
FIG. 2B illustrates a schematic diagram showing obtaining an image in different operating modes according to some embodiments of the present disclosure.

The technical solution of embodiments of the present disclosure is described in detail below in connection with the accompanying drawings of embodiments of the present disclosure. Described embodiments are only some embodiments of the present disclosure and not all embodiments. All other embodiments obtained by those of ordinary skill in the art without creative efforts are within the scope of the present disclosure.

In the description below, "some embodiments" describe a subset of all possible embodiments. "some embodiments" can refer to a same subset or different subsets of all possible embodiments, which can be combined with each other when there is no conflict.

In the subsequent description, suffixes such as "module," "component," or "unit" can represent an element and is used solely to facilitate the description of the present disclosure. The suffixes do not have specific meanings. Therefore, "module," "component," or "unit" can be used interchangeably.

In embodiments of the present disclosure, terms of first, second, and third are used solely to distinguish similar objects and do not indicate any specific order. A specific order or sequence of first, second, and third can be interchanged to allow embodiments of the present disclosure to be implemented in an order different from the embodiments illustrated or described here.

Embodiments of the present disclosure provide an image acquisition method. FIG. 1B illustrates a schematic flowchart of the image acquisition method according to some embodiments of the present disclosure. As shown in FIG. 1B, the method includes the following steps.

At S101, if a target application is in a target operating mode, a first image is obtained based on a target camera in a first operating mode, and a second image is obtained based on the target camera in a second operating mode. The first image and the second image have different resolutions.

That is, in the target operating mode of the target application, the target camera (hardware camera) can obtain the first image in the first operating mode and obtain the second image in the second operating mode. The first image and the second image can have different resolutions.

In the target operating mode, the two operating modes of the hardware camera can be switched automatically or manually, which is not limited in embodiments of the present disclosure. For example, a photosensitive assembly of the hardware camera can include an array composed of 200M pixels, and the photosensitive assembly can support a plurality of operating modes, such as an array of 12.5M pixels with 16-in-1 (first operating mode), an array of 50M pixels with 4-in-1 (second operating mode), and an array of 200M pixels. In embodiments of the present disclosure, a camera can switch among a plurality of operating modes. No matter in which operating mode the hardware camera is, a captured image obtained by the photosensitive assembly through a lens can be used to generate a photographing stream and a preview stream. A resolution of each frame of photographed image of the photographing stream can be consistent with a resolution of the captured image. The resolution of each frame of preview image of the preview stream can be lower than the resolution of the captured image. The resolution of the captured image can be determined according to the plurality of operating modes supported by the photosensitive assembly of the hardware camera. For example, the resolution of the captured image obtained when the photosensitive assembly of the hardware camera is in the first operating mode (12.5M pixels) can be lower than the resolution of the captured image obtained when the photosensitive assembly of the hardware camera is in the second operating mode (50M pixels). The first image of embodiments of the present disclosure can be a captured image or a photographed image. The second image can be a captured image or a photographed image.

The method of embodiments of the present disclosure is more efficient compared to the implementation shown in FIG. 1A. A user does not need to switch back and forth between different operating modes of the application shown in FIG. 1A to search for a specific operating mode of the application. For example, FIG. 1A illustrates a schematic diagram of image acquisition in the existing technology. As shown in FIG. 1A, if the user wants to photograph with high resolution, the user needs to switch between the plurality of operating modes of the photographing application (e.g., a recording mode, a photographing mode, a panorama mode, a high-resolution mode, etc.). If the user does not find the mode in an interaction interface of the current application, the user then needs to click on "more" to expand a second-level interface to search for an operating mode provided by the application until "the high-resolution mode" is found. Such search operation is complicated and affects efficiency. In the method of embodiments of the present disclosure, the user only needs to focus on an operating mode and does not need to switch between the plurality of operating modes manually. For example, a photographed image with two different resolutions can be obtained in a photographing operating mode of the application, which is more efficient. In the method of embodiments of the present disclosure, the camera assembly can obtain the photographed image with two different resolutions when the application is in the photographing operating mode. In the method of embodiments of the present disclosure, when responding to a photographing instruction to obtain the photographed image, the photographed image can be obtained by the photosensitive assembly of the hardware camera based on one of the plurality of operating modes supported by the hardware camera that corresponds to the photographing instruction.

Embodiments of the present disclosure further provide an image acquisition method. If the target application is in the target operating mode, the first image can be obtained by the target camera in the first operating mode, and the second image can be obtained by the target camera in the second operating mode. The first operating mode and the second operating mode can be determined based on the obtained target parameter. The target camera can be switched between the first operating mode and the second operating mode. The method further includes obtaining the target parameter and determining the switch of the target camera between the first operating mode and the second operating mode based on the target parameter. The target parameter can represent ambient light intensity corresponding to the target operating mode in which the target application is. The target parameter can be obtained through an ambient light sensor. The target parameter can be obtained by analyzing a captured image obtained by the photosensitive assembly of the hardware camera, for example, obtaining a value of an ISO sensitivity of the captured image. The target camera can be switched from the first operating mode to the second operating mode or from the second operating mode to the first operating mode according to the target parameter and a switch condition. In some embodiments, the target parameter can be the first target parameter. The first target parameter can be used to represent ambient light when the target camera is in the first operating mode. That is, the target camera can obtain a first ambient light intensity in the first operating mode, or a first value of the ISO sensitivity can be determined by analyzing the first captured image obtained by the target camera in the first operating mode. If the first target parameter satisfies a first switch condition, the target camera can be switched from the first operating mode to the second operating mode. The resolution of the first image corresponding to the first operating mode can be smaller than the resolution of the second image corresponding to the second operating mode.

In some embodiments, if the obtained target parameter is a second target parameter, the second target parameter can be used to represent the ambient light when the target camera is in the second operating mode. If the second target parameter satisfies a second switch condition, the target camera can be switched from the second operating mode to the first operating mode. The resolution of the first image corresponding to the first operating mode can be smaller than the resolution of the second image corresponding to the second operating mode. The first switch condition and the second switch condition can have different values.

In some other embodiments, a difference from embodiments above can include, to ensure the switch accuracy, that, in the method of embodiments of the present disclosure, if obtaining the first target parameter includes obtaining an ISO sensitivity of the captured image obtained by the target camera in the first operating mode, and the captured image includes a multi-frame captured image, the ISO sensitivity of each frame of the multi-frame captured image obtained by the target camera in the first operating mode can be determined to satisfy the first switch condition. Then, the target camera can be switched from the first operating mode to the second operating mode. The resolution of the first image corresponding to the first operating mode can be smaller than the resolution of the second image corresponding to the second operating mode. For example, a predetermined number of captured images can be 10 frames. For brevity, duplicated contents are not repeated. Obtaining the second target parameter can include determining the ISO sensitivity of each frame of the multi-frame captured image obtained by the target camera in the second operating mode, and if the ISO sensitivity of each frame of the multi-frame captured image obtained by the target camera in the second operating mode satisfies the second switch condition, switching the target camera from the second operating mode to the first operating mode.

Embodiments of the present disclosure provide another method. The first operating mode can be switched through a user manual input operation. If the target camera is in the second operating mode, the input operation (i.e., obtaining a target parameter) can be obtained. The resolution of the first image corresponding to the first operating mode can be lower than the resolution of the second image corresponding to the second operating mode. If the input operation satisfies the target operation, the target camera can be switched from the second operating mode to the first operating mode. The target operation can trigger the hardware camera to switch or can trigger to switch from the hardware camera (i.e., target camera—first hardware camera) to another hardware camera (i.e., a second hardware camera different from the first hardware camera). The target operation can include changing zoom for image capturing, lens switching (macro, wide, telephoto), or manually changing the exposure time collected in the target operating mode. This embodiment can be combined with any other embodiment above, which is not repeated for brevity.

Embodiments of the present disclosure further provide an image acquisition method, which can be combined with any one of the embodiments above. Determining the switching of the target camera between the first operating mode and the second operating mode can include at least one of the following.

First, a camera used in the target operating mode can be controlled to switch between a logical camera and the first hardware camera. The target camera can be the first hardware camera. The logical camera can correspond to a plurality of hardware cameras, which include the first hardware camera. The logical camera can include control logic of causing the first hardware camera to be in the first operating mode. That is, the first hardware camera can be in the operation state and powered on. To switch to the second operating mode, the target camera may need to be switched to the first hardware camera. Then, the first hardware camera can be powered off and powered on, which takes a certain time.

Second, based on the logical camera corresponding to the target operating mode, the first hardware camera can be controlled to switch between the first operating mode and the second operating mode. The target camera can be the first hardware camera, The logical camera can correspond to a plurality of hardware cameras, which includes the first hardware camera. The logical camera can include the control logic of causing the first hardware camera to be in the first operating mode and the control logic of causing the first hardware camera to be in the second operating mode.

Third, the operating mode of the first hardware camera can be directly controlled for switching.

For the first case, determining the switching of the target camera between the first operating mode and the second operating mode can include, based on a target strategy, controlling the target camera to switch between the first operating mode and the second operating mode. The target strategy can include displaying a target image in the preview area of the target operating mode during the switching process between the logical camera and the first hardware camera. The target image can include one of the following. a. If the target camera is switched from the first operating mode to the second operating mode, the preview image can be generated based on a first captured image obtained by the photosensitive assembly of the first hardware camera in the first operating mode. The preview image can be a preview image of a frame before the switch. b. If the target camera is switched from the second operating mode to the first operating mode, a preview image can be generated based on the first captured image obtained by the photosensitive assembly of the first hardware camera in the second operating mode. The preview image can be a preview image of a frame before the switch. To achieve a smooth transition effect of the switch, the target image can be blurred or processed with Gaussian blur, the preview image obtained in the target operational mode after the switch can be more coherent with the preview image obtained before the switch.

For the second and third cases, since the first hardware camera does not need to be restarted during the switching processes, the switching processes of the second and third cases can be faster and more coherent compared to the switching process of the first case. Thus, the target image may not need to be displayed in the switching process. In some other embodiments, the target image can also be displayed, which is not limited here.

Embodiments of the present disclosure provide another image acquisition method, which can enhance the stability of the switching process. Determining the switching of the target camera between the first operating mode and the second operating mode can include controlling the target camera to switch between the first operating mode and the second operating mode based on a target strategy. The target strategy can include at least one of the following. a. No new switching instruction can be performed during one switching process between the first operating mode and the second operating mode of the target camera. b. After the target camera is switched from the second operating mode to the first operating mode, the target parameter can be obtained satisfying the target time length. c. When the target application is started, and the second image is obtained in the target operating mode based on the target camera that is in the second operating mode, the target parameter can be obtained satisfying the target time length. The method can be combined with any embodiment above, which is not repeated for brevity.

Based on the above, embodiments of the present disclosure further provide an image acquisition method. The method can be applied to the electronic device. The method includes the following processes.

At S111, if the target application is in the target operating mode, the first image is obtained based on the target camera in the first operating mode, and the second image is obtained based on the target camera in the second operating mode. The resolution of the first image and the resolution of the second image are different.

At S112, the target parameter is obtained.

The target parameter can be ambient light information when the camera application is in the target operating mode. The target parameter can also be operation interface changing information performed by the user.

At S113, the switching of the target camera between the first operating mode and the second operating mode is determined based on the target parameter.

In some embodiments, determining the switching of the target camera between the first operating mode and the second operating mode includes at least one of the following.

First, the camera applied in the target operating mode can be controlled to switch between the logical camera and the first hardware camera. The target camera can be the first hardware camera, and the logical camera can correspond to the plurality of hardware cameras. The logical camera can include the control logic of causing the first hardware camera in the first operating mode.

Thus, the logical camera only includes the control logic of the first hardware camera in the first operating mode. If the target camera needs to be switched to the second operating mode, the logical camera cannot realize the switch. For the application, switching the logical camera to the hardware camera to operate in the second operating mode can cause the hardware to be powered on and off.

Second, based on the logical camera corresponding to the target operating mode, the first hardware camera can be controlled to switch between the first operating mode and the second operating mode. The target camera can be the first hardware camera. The logical camera can include a plurality of hardware cameras, which includes the first hardware camera. The logical camera can include the control logic of causing the first hardware camera to be in the first operating mode and causing the first hardware camera to be in the second operating mode.

Thus, in the target operating mode, a camera can be called. The logical camera can be a virtual camera implementing the running program in the target operating mode. The virtual camera can be a logic of a set of software or a method of a set of software. Since the device includes a plurality of hardware cameras (e.g., telephoto camera, short focus camera), the hardware cameras can be switched by the logical camera, which prevents flickering. The application can only be associated with the logical camera. Thus, the logical camera can be used to realize the switching of the physical cameras, which is imperceptible to the user. Therefore, if the logical camera includes two sets of control logic of controlling the first operating mode and the second operating mode, the hardware camera can be configured to operate in the first operating mode or the second operating mode.

During the process of powering off and then powering on the hardware camera, a certain image can be displayed to cause the switching of the operating modes to be imperceptible to the user. For example, the last frame of the preview image can be displayed and implemented using a mask or coating method.

In some embodiments, determining the switching of the target camera between the first operating mode and the second operating mode can include controlling the target camera to switch between the first operating mode and the second operating mode based on a target strategy.

In some embodiments, the target strategy can include at least one of the following.

First, the target image can be displayed in the preview area of the target operating mode during the switching between the logical camera and the first hardware camera.

For example, a coating layer can be added to cause blurring.

Second, the target camera may not perform a new switching instruction during the switching between the first operating mode and the second operating mode.

For example, during the switching between a high-resolution mode and a high-sensitivity mode, changes in ambient light can be ignored. Thus, no switching instruction can be executed.

Thirdly, after the target camera is switched from the second operating mode to the first operating mode, the target camera can obtain the target parameter by satisfying the target time length.

For example, the changes in ambient light can be ignored within 3 seconds after exiting the high-resolution mode, and then the target parameter can be obtained after 3 seconds.

Fourthly, when the target application is started, and the second image is obtained in the target operating mode based on the target camera in the second operating mode, the target parameter can be obtained by satisfying the target time length.

For example, if the high-resolution option is enabled when the camera is exited last time, the change of the ambient light can be ignored within the first 3 seconds when the camera is cold or hot-started next time.

According to the second to fourth target strategies above, a false operation of switching back and forth can be prevented.

Based on the above, embodiments of the present disclosure can further provide an image acquisition method. The method can be applied to the electronic device. FIG. 2A illustrates a schematic flowchart of an image acquisition method according to some embodiments of the present disclosure. As shown in FIG. 2A, the method includes the following steps.

At S201, if the target application is in the target operating mode, the first image is obtained based on the target camera in the first operating mode, and the second image is obtained based on the target camera in the second operating mode. The resolution of the first image and the resolution of the second image are different.

At S202, the first target parameter is obtained. The first target parameter is used to characterize the ambient light when the target camera is in the first operating mode.

The first target parameter can be ambient light information obtained when the target camera is in the first operating mode.

In some embodiments, the ambient light corresponding to the first target parameter can be obtained through ISO (International Organization for Standardization) of the image photographed when the target camera is in the first operating mode, through the ISO of the preview image when the target camera is in the first operating mode, or through data detected by an ambient light sensor when the target camera is in the first operating mode.

At S203, the second target parameter is obtained. The second target parameter is used to characterize the ambient light when the target camera is in the second operating mode.

The second target parameter can be the ambient light information obtained when the camera is in the second operating mode.

In some embodiments, the ambient light corresponding to the second target parameter can be obtained through the ISO of the image captured when the target camera is in the second operating mode, through the ISO of the preview image when the target camera is in the second operating mode, or through the data detected by the ambient light sensor when the target camera is in the second operating mode.

At S204, if the first target parameter satisfies the first switch condition, the target camera is switched from the first operating mode to the second operating mode. The resolution of the first image corresponding to the first operating mode is lower than the resolution of the second image corresponding to the second operating mode.

The first switch condition can include that the first target parameter is greater than or equal to the first predetermined threshold.

At S205, if the second target parameter satisfies the second switch condition, the target camera is switched from the second operating mode to the first operating mode. The resolution of the first image corresponding to the first operating mode is lower than the resolution of the second image of the second operating mode.

The second switch condition can include that the second target parameter is smaller than or equal to the second predetermined threshold. The first predetermined value can be greater than the second predetermined value.

In some embodiments, in S202, obtaining the first target parameter can include determining the ISO sensitivity of the photographed image obtained when the target camera is in the first operating mode.

The current preview image can be obtained when the target camera is in the first operating mode. The ISO sensitivity of this preview image can be used as the first target parameter. The preview image can be a single-frame image or a plurality of consecutive frames of images, for example, 10 consecutive frames of images.

In some embodiments, the ambient light information when the target camera is in the first operating mode can be obtained through the ISO sensitivity of the preview image obtained when the target camera is in the first operating mode.

In some embodiments, the photographed image can include the plurality of consecutive frames of images. Correspondingly, determining the ISO sensitivity of the photographed image obtained when the target camera is in the first operating mode can include determining an ISO sensitivity of each frame of the multi-frame image when the target camera is in the first operating mode.

For example, the current multi-frame preview image can be obtained when the target camera is in the first operating mode. The ISO sensitivity of the multi-frame preview image can be used as the first target parameter. Thus, the ISO sensitivity of each frame of the multi-frame preview image can be compared with a threshold value. If the ISO sensitivity of each frame satisfies the condition, switching can be performed.

In some embodiments, in step S203, obtaining the second target parameter can include determining the ISO sensitivity of the photographed image obtained when the target camera is in the second operating mode.

The current preview image can be obtained when the target camera is in the second operating mode. The ISO sensitivity of the preview image can be used as the second target parameter. The preview image can be a single-frame image or a multi-frame image, for example, consecutive 10 frames of images.

In some embodiments, through the ISO sensitivity of the preview image obtained when the target camera is in the second operating mode, the ambient light information can be obtained when the target camera is in the second operating mode.

In some embodiments, determining the ISO sensitivity of the photographed image obtained when the target camera is in the second operating mode can include determining the ISO sensitivity of each frame of the multi-frame image obtained when the target camera is in the second operating mode.

For example, the current multi-frame preview image can be obtained when the target camera is in the second operating mode. The ISO sensitivity of the multi-frame image can be used as the second target parameter. Then, the ISO sensitivity of each frame of the multi-frame preview image can be compared with a threshold. If the ISO sensitivity of each frame of the preview image satisfies the condition, the switching can be performed.

When the photographed image includes the multi-frame photographed image, a determination accuracy can be higher, and a switch result can be more accurate.

In some embodiments, the first operating mode can be a high-sensitivity mode, and the second operating mode can be a high-resolution mode.

FIG. 2B illustrates a schematic diagram showing obtaining an image in different operating modes according to some embodiments of the present disclosure. As shown in FIG. 2B, image 21 is a schematic image of a preview image obtained by the target camera in the high-resolution mode (second operating mode) when the target application is in the target operating mode (photographing mode). Image 22 is a schematic image of a photographed image photographed by the target camera in the high-resolution mode (second operating mode). Image 23 is a schematic image of a preview image obtained by the target camera in the high-sensitivity mode (first operating mode) when the target application is in the target operating mode (photographing mode). Image 24 is a schematic image of a photographed image photographed by the target camera in the high-sensitivity mode (first operating mode). The photographed images obtained when the target camera in different operating modes can have different resolutions.

Figure 3:
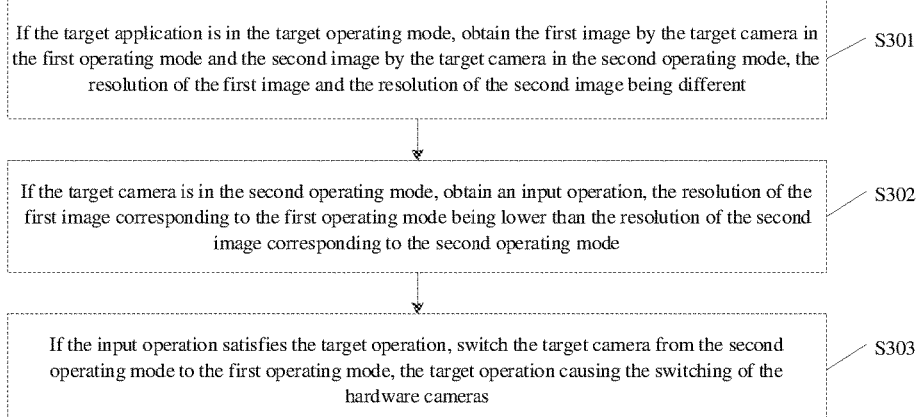
FIG. 3 illustrates a schematic flowchart of an image acquisition method according to some embodiments of the present disclosure.

Based on the above, embodiments of the present disclosure provide another image acquisition method. The method can be applied to the electronic device. FIG. 3 illustrates a schematic flowchart of the image acquisition method according to some embodiments of the present disclosure. As shown in FIG. 3, the method includes the following steps.

At S301, if the target application is in the target operating mode, the first image is obtained by the target camera in the first operating mode, and the second image is obtained by the target camera in the second operating mode. The resolution of the first image and the resolution of the second image are different.

At S302, if the target camera is in the second operating mode, an input operation is obtained. The resolution of the first image corresponding to the first operating mode is lower than the resolution of the second image corresponding to the second operating mode.

At S303, if the input operation satisfies the target operation, the target camera is switched from the second operating mode to the first operating mode. The target operation can cause the switching of the hardware cameras.

In any scenario, if the target camera is in the second operating mode, and the obtained input operation satisfies the target operation, the target camera can be switched from the second operating mode to the first operating mode. For example, the target camera can be in the high-resolution mode, and the input operation that meets the target operation can be obtained. Even though the current ambient light intensity is determined to be good, the operating mode switch operation can be still performed. The target camera can be switched from the high-resolution mode to the high-sensitivity mode. For another example, if the high-resolution menu is enabled when the camera is exited last time, the target camera can be switched from the high-resolution mode to the high-sensitivity mode once the target operation is obtained when the camera is cold or hot-started next time. Thus, no matter how the current ambient light intensity is, or whether the target camera is currently in the maintaining status of the operating mode, the operating modes can be switched according to the operations of the user, which satisfies the user needs.

The target operation can include, but is not limited to, changing zoom for image capturing, lens switching (macro, wide, telephoto), or manually changing the exposure time.

In some embodiments, the target operation can be an operation of causing the hardware camera to switch. For example, the zoom operation can cause the camera to be switched from the short focus camera to the telephoto camera.

Based on the above, embodiments of the present disclosure further provide an image acquisition method applied in the electronic device. In this method, a suitable operating mode of the target camera can be automatically determined and selected based on the actual light during photographing. The high-resolution (mosaic mode) mode can be used in a high-brightness level environment, which can result in a better image analysis ability. A high-sensitivity (Binning mode) mode can be used in a low-brightness level environment, which brings better image quality.

Figures 4, 5:
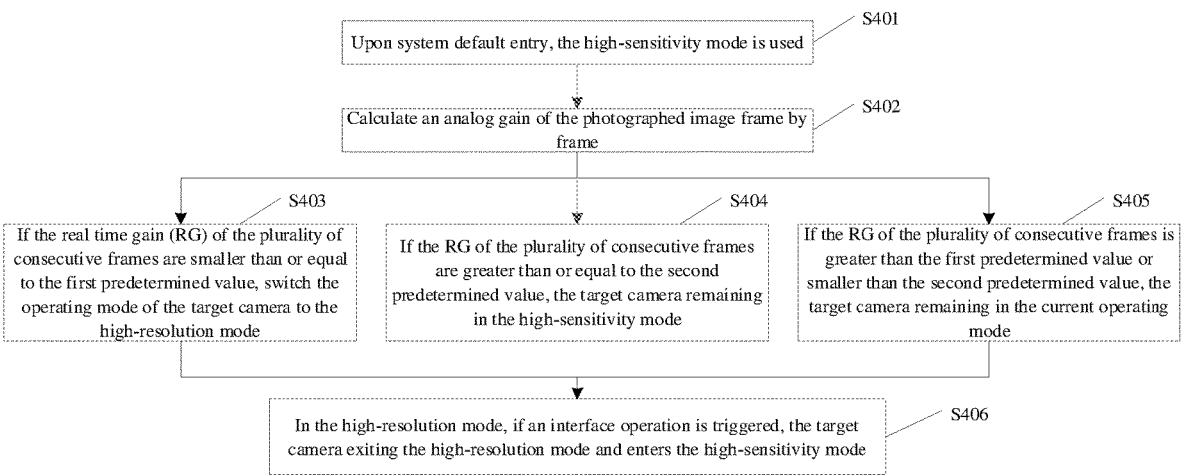
FIG. 4 illustrates a schematic flowchart of an image acquisition method according to some embodiments of the present disclosure.
FIG. 5 illustrates a schematic structural diagram of an image acquisition device according to some embodiments of the present disclosure.

FIG. 4 illustrates a schematic flowchart of an image acquisition method according to some embodiments of the present disclosure. As shown in FIG. 4, the method includes the following steps.

At S401, upon system default entry, the high-sensitivity mode is used.

The high-sensitivity mode can have a wide range of application scenarios and can be set as the default operating mode of the target camera.

At S402, a real time gain (RG) of the photographed image is calculated frame by frame.

At S403, if the RGs of the plurality of consecutive frames are smaller than or equal to the first predetermined value, the operating mode of the target camera is switched to the high-resolution mode.

If the RG of the plurality of consecutive frames is smaller than or equal to zero, the light environment can be determined to be good, and the high-resolution mode can be used confidently. Then, the user interface can prompt the user of entering the high-resolution mode, and the camera APP can release the instruction to the camera sensor to switch the operating mode to the high-resolution mode.

At S404, if the RGs of the plurality of consecutive frames are greater than or equal to the second predetermined value, the target camera can remain in the high-sensitivity mode.

In some embodiments, the first predetermined value can be smaller than the second predetermined value. For example, the first predetermined value can be 2, and the second predetermined value can be 6.

If the RGs of the plurality of consecutive frames can be greater than or equal to the second predetermined value, the light environment can be determined to be dark, and the operating mode can remain the high-sensitivity mode.

At S405, if the RG of the plurality of consecutive frames is greater than the first predetermined value or smaller than the second predetermined value, the target camera can remain in the current operating mode.

If the RGs of the plurality of consecutive frames are greater than the first predetermined value and smaller than the second predetermined value, the current mode can remain. That is, if the current operating mode is the high-resolution mode, the target camera can continue to remain in the high-resolution mode. If the current operating mode is the high-sensitivity mode, the target camera can remain in the high-sensitivity mode.

At S406, in the high-resolution mode, if an interface operation is triggered, the target camera exits the high-resolution mode and enters the high-sensitivity mode.

If the user operates a user interface (UI) function actively, the target camera can be switched from the high-resolution mode to the high-sensitivity mode.

In some embodiments, triggering the interface operation can include at least one of changing zoom for image capturing, lens switching (macro, wide, telephoto), or manually changing the exposure time.

In some embodiments, to avoid oscillation during switching and hardware limitations, the method can also include the following.

(1) The changes in the RG of the photographed image can be ignored within a predefined time period after exiting the high-resolution mode. For example, the predefined time can be set to 3 seconds.

(2) The changes in the RG of the photographed image can be ignored during the switching process between the high-resolution mode and the high-sensitivity mode.

(3) If the high-resolution option was enabled when the camera exits last time, the changes in the RG of the photographed image can be ignored within the predefined time period when the camera is cold or hot-started next time.

In the high-resolution mode, motion photos may not be supported. In the high-resolution mode, night photography may not be supported.

The image acquisition method of embodiments of the present disclosure can be simple for the user. In the image acquisition method, the photographed images with different resolutions can be automatically generated without a learning cost.

Based on the above, embodiments of the present disclosure provide an image acquisition device. This device can include various units, modules included in the units, and components included in the modules, which can be implemented through the processor of the electronic device or specific logic circuits. During the implementation, the processor can be a Central Processing Unit (CPU), Microprocessor Unit (MPU), Digital Signal Processing (DSP) unit, or Field Programmable Gate Array (FPGA), etc.

FIG. 5 illustrates a schematic structural diagram of the image acquisition device 500 according to some embodiments of the present disclosure. As shown in FIG. 5, the device 500 includes a processing unit 501.

The processing unit 501 can be configured to obtain the first image based on the target camera in the first operating mode when the target application is in the target operating mode and obtain the second image based on the target camera in the second operating mode.

The resolution of the first image and the resolution of the second image can be different.

In some embodiments, the device further includes a parameter acquisition unit and a mode switch unit.

The parameter acquisition unit can be configured to obtain the target parameter.

The mode switch unit can be configured to determine the switching between the first operating mode and the second operating mode based on the target parameter.

In some embodiments, the parameter acquisition unit can include at least one of a first parameter acquisition module or a second parameter acquisition module.

The first parameter acquisition module can be configured to obtain the first target parameter. The first target parameter can be used to characterize the ambient light when the target camera is in the first operating mode.

The second parameter acquisition module can be configured to obtain the second target parameter. The second target parameter can be used to characterize the ambient light when the target camera is in the second operating mode.

Correspondingly, the mode switch unit can include at least one of a first mode switch module or a second mode switch module.

The first mode switch module can be configured to switch the target camera from the first operating mode to the second operating mode if the first target parameter meets the first switch condition. The resolution of the first image corresponding to the first operating mode can be lower than the resolution of the second image corresponding to the second operating mode.

The second mode switch module can be configured to switch the target camera from the second operating mode to the first operating mode if the second target parameter meets the second switch condition. The resolution of the first image corresponding to the first operating mode can be lower than the resolution of the second image corresponding to the second operating mode.

In some embodiments, the first parameter acquisition module can include a first parameter acquisition component.

The first parameter acquisition component can be configured to determine the ISO sensitivity of the photographed image obtained when the target camera is in the first operating mode.

The second parameter acquisition module can include a second parameter acquisition component.

The second parameter acquisition component can be configured to determine the ISO sensitivity of the photographed image obtained when the target camera is in the second operating mode.

In some embodiments, the photographed image can be the plurality of consecutive frames of images.

Correspondingly, the first parameter acquisition component can include a first parameter acquisition sub-component.

The first parameter acquisition sub-component can be configured to determine the ISO sensitivity of each frame of photographed image of the multi-frame image obtained when the target camera is in the first operating mode.

The second parameter acquisition component can include a second parameter acquisition sub-component.

The second parameter acquisition sub-component can be configured to determine the ISO sensitivity of each frame of photographed image of the multi-frame image obtained when the target camera is in the second operating mode.

In some embodiments, the parameter acquisition unit can include a parameter acquisition sub-unit.

The parameter acquisition sub-unit can be configured to obtain the input operation if the target camera is in the second operating mode. The resolution of the first image corresponding to the first operating mode can be lower than the resolution of the second image corresponding to the second operating mode.

The mode switch unit can include a first mode switch sub-unit.

The first mode switch sub-unit can be configured to switch the target camera from the second operating mode to the first operating mode if the input operation satisfies the target operation. The target operation can be used to cause the switching of the hardware camera.

In some embodiments, the mode switch unit can include at least one of a first switch sub-unit or a second switch sub-unit.

The first switch sub-unit can be configured to control the camera used in the target operating mode to switch between the logical camera and the first hardware camera. The target camera can be the first hardware camera. The logical camera can correspond to the plurality of hardware cameras. The plurality of hardware cameras can include the first hardware camera. The logical camera can include the control logic of causing the first hardware camera to be in the first operating mode.

The second switch sub-unit can be configured to control the first hardware camera to switch between the first operating mode and the second operating mode based on the logical camera corresponding to the target operating mode. The target camera can be the first hardware camera. The logical camera can correspond to the plurality of hardware cameras. The plurality of hardware cameras can include the first hardware camera. The logical camera can include the control logic of causing the first hardware camera to be in the first operating mode and the control logic of causing the first hardware camera to be in the second operating mode.

In some embodiments, the mode switch unit can include a second mode switch sub-unit.

The second mode switch sub-unit can be configured to control the target camera to switch between the first operating mode and the second operating mode based on the target strategy.

In some embodiments, the target strategy can include at least one of the following.

The preview area of the target operating mode can be used to display the target image during the switching between the logical camera and the first hardware camera.

The target camera may not perform the new switch instruction during the switching between the first operating mode and the second operating mode.

After the target camera is switched from the second operating mode to the first operating mode, the target parameter can be obtained by satisfying the target time length.

When the target application is started, and the second image is obtained in the target operating mode based on the target camera in the second operating mode, the target parameter can be obtained by satisfying the target time length.

The description of device embodiments above is similar to the description of method embodiments above and has similar advantageous effects with method embodiments. For technical details not disclosed in device embodiments of the present disclosure, reference can be made to the description of method embodiments of the present disclosure.

In embodiments of the present disclosure, if the image acquisition method described above is implemented in the form of a software function module and sold or used as an independent product, the image acquisition method can also be stored in a computer-readable storage medium. Based on such an understanding, the essence of the technical solution of embodiments of the present disclosure, or the part that contributes to the existing technology, can be embodied in the form of a software product. The software product can be stored in a storage medium and includes several instructions for causing the electronic device (e.g., a personal computer, a server, etc.) to perform all or a part of the methods of embodiments of the present disclosure. The aforementioned storage medium can include various media configured to store program codes, such as a USB drive, an external hard drive, a Read Only Memory (ROM), a magnetic disk, or an optical disk. Thus, embodiments of the present disclosure are not limited to any specific combination of hardware and software.

Correspondingly, embodiments of the present disclosure provide an electronic device, including a memory and a processor. The memory stores a computer program that can be executed on the processor that, when executed by the processor, causes the processor to perform the steps of the image acquisition method above.

Correspondingly, embodiments of the present disclosure provide a readable storage medium, storing a computer program that, when executed by a processor, causes the processor to perform the steps of the image acquisition method above.

The description of the storage medium and device embodiments can be similar to the description of method embodiments, which has a similar beneficial effect as method embodiments. For the technical details not disclosed in the storage medium and device embodiments of the present disclosure, reference can be made to method embodiments of the present disclosure.

Figure 6:
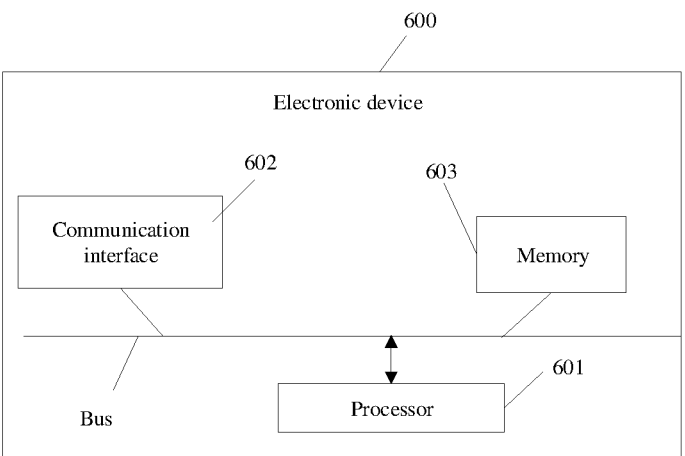
FIG. 6 illustrates a schematic diagram of a hardware physical body of an electronic device according to some embodiments of the present disclosure.

FIG. 6 illustrates a schematic diagram of a hardware physical body of the electronic device according to some embodiments of the present disclosure. As shown in FIG. 6, the hardware physical body of the electronic device 600 includes a processor 601, a communication interface 602, and a memory 603.

The processor 601 can be configured to control the overall operation of the electronic device 600.

The communication interface 602 can be configured to cause the electronic device 600 to communicate with another electronic device, a server, or a platform through the network.

The memory 603 can be used to store the instructions and the application that can be performed by the processor 601 and cache the data that is to be processed or has been processed in the processor 601 and the electronic device 600 (e.g., image data, audio data, audio communication data, and video communication data), which can be realized by FLASH or Random Access Memory (RAM).

In embodiments of the present disclosure, the disclosed device and method can be implemented through other methods. The above device embodiments are illustrative. For example, the unit division can be merely a logical functional division, which can be divided in another division method. For example, a plurality of units or assemblies can be combined or integrated into another system. In some other embodiments, some features can be ignored or may not be executed. In addition, the coupling, direct coupling, or communicative connection between components displayed or discussed can be realized through the indirect coupling or communicative connection of some interfaces, devices, or units, which can be electrical, mechanical, or other forms.

The units described as discrete components can be or may not be physically apart. The component displayed as a unit can be or may not be a physical unit. That is, the component can be at a place or can be distributed at a plurality of network units. Some or all units can be selected to realize the purpose of the solution of the present disclosure as needed.

In addition, functional units of embodiments of the present disclosure can be fully integrated into one processing module, or the units each can be used as a single unit, or two or more units can be integrated into one unit. The above-integrated unit can be implemented in the form of hardware or in the form of hardware plus software functional units. Those of ordinary skills in the art can understand that all or a part of the steps can be completed by the hardware related to the program instructions. The program can be stored in the computer-readable storage medium. When the program is executed, the steps of method embodiments can be performed. The storage medium can include various media capable of storing program codes such as mobile storage devices, ROM, RAM, magnetic disks or optical disks.

The methods disclosed of method embodiments of the present disclosure can be combined arbitrarily to obtain new method embodiments when there is no conflict.

The features disclosed in several product embodiments of the present disclosure can be combined arbitrarily to obtain new product embodiments when there is no conflict.

The features disclosed in the method or device embodiments of the present disclosure can be combined arbitrarily to obtain new method embodiments or device embodiments when there is no conflict.

The above are only some embodiments of the present disclosure. However, the present disclosure is not limited to here. Those skilled in the art can easily think of modifications or replacements within the scope of the present disclosure. These modifications and replacements should be within the scope of the present disclosure. Thus, the present disclosure should be subject to the scope of the appended claims.

What is claimed is:

1. An image acquisition method, comprising:

in response to a target application being in a target operating mode:

obtaining a target parameter by analyzing a captured image obtained by a target camera in a current operating mode, the current operating mode being one of a first operating mode and a second operating mode, and obtaining the target parameter including:

in response to the target camera being in the second operating mode, obtaining an input operation;

switching the target camera between the first operating mode and the second operating mode based on the target parameter, including:

in response to the input operation satisfying a target operation, switching the target camera from the second operating mode to the first operating mode, the target operation being capable of causing switching of a hardware camera;

obtaining a first image by the target camera in the first operating mode; and obtaining a second image by the target camera in the second operating mode;

wherein a resolution of the first image corresponding to the first operating mode is lower than a resolution of the second image corresponding to the second operating mode.

2. The method according to claim 1, wherein:

obtaining the target parameter further includes at least one of:

obtaining a first target parameter, the first target parameter being used to characterize ambient light when the target camera is in the first operating mode; or obtaining a second target parameter, the second target parameter being used to characterize ambient light when the target camera is in the second operating mode;

correspondingly, switching the target camera between the first operating mode and the second operating mode based on the target parameter further includes at least one of:

in response to the first target parameter satisfying a first switch condition, switching the target camera from the first operating mode to the second operating mode; or in response to the second target parameter satisfying a second switch condition, switching the target camera from the second operating mode to the first operating mode.

3. The method according to claim 2, wherein:

obtaining the first target parameter includes determining an ISO sensitivity of a photographed image obtained by the target camera in the first operating mode; and obtaining the second target parameter includes determining an ISO sensitivity of a photographed image obtained by the target camera in the second operating mode.

4. The method according to claim 3, wherein:

the photographed image includes a multi-frame photographed image;

correspondingly, determining the ISO sensitivity of the photographed image obtained by the target camera in the first operating mode includes determining an ISO sensitivity of each frame of the multi-frame photographed image obtained by the target camera in the first operating mode; and determining the ISO sensitivity of the photographed image obtained by the target camera in the second operating mode includes determining an ISO sensitivity of each frame of the multi-frame photographed image obtained by the target camera in the second operating mode.

5. The method according to claim 2, wherein:
the first switch condition includes that the first target parameter being greater than or equal to a first predetermined threshold;
the second switch condition includes that the second target parameter being smaller than or equal to a second predetermined threshold; and
the first predetermined threshold is different from the second predetermined threshold.

6. The method according to claim 1, wherein switching the target camera between the first operating mode and the second operating mode further includes at least one of:
controlling a camera used in the target operating mode to be switched between a logical camera and a first hardware camera, wherein:
the target camera is the first hardware camera;
the logical camera corresponds to a plurality of hardware cameras;
the plurality of hardware cameras include the first hardware camera; and
the logical camera includes control logic of causing the first hardware camera to be in the first operating mode; or
controlling the first hardware camera to be switched between the first operating mode and the second operating mode based on the logical camera corresponding to the target operating mode, wherein:
the target camera is the first hardware camera;
the logical camera corresponds to the plurality of hardware cameras;
the plurality of hardware cameras include the first hardware camera; and
the logical camera includes the control logic of causing the first hardware camera to be in the first operating mode and control logic of causing the first hardware camera to be in the second operating mode.

7. The method according to claim 6, wherein switching the target camera between the first operating mode and the second operating mode includes:
controlling the switching of the target camera between the first operating mode and the second operating mode based on a target strategy.

8. The method according to claim 7, wherein the target strategy includes at least one of:
displaying a target image in a preview area of the target operating mode during a switch process between the logical camera and the first hardware camera;
performing no new switch instruction during the switching between the first operating mode and the second operating mode of the target camera;
after the target camera is switched from the second operating mode to the first operating mode, obtaining the target parameter by satisfying a target time length; or
starting the target application and obtaining the second image in the target operating mode based on the target camera in the second operating mode to obtain the target parameter by satisfying the time length.

9. An image acquisition device comprising:
a processing unit configured to perform the method according to claim 1.

10. A non-transitory computer-readable storage medium storing a computer program that, when executed by a processor, causes the processor to perform the method according to claim 1.

11. The storage medium according to claim 10, wherein the processor is further configured to:
control a camera used in the target operating mode to be switched between a logical camera and a first hardware camera, wherein:
the target camera is the first hardware camera;
the logical camera corresponds to a plurality of hardware cameras;
the plurality of hardware cameras include the first hardware camera; and
the logical camera includes control logic of causing the first hardware camera to be in the first operating mode; or
control the first hardware camera to be switched between the first operating mode and the second operating mode based on the logical camera corresponding to the target operating mode, wherein:
the target camera is the first hardware camera;
the logical camera corresponds to the plurality of hardware cameras;
the plurality of hardware cameras include the first hardware camera; and
the logical camera includes the control logic of causing the first hardware camera to be in the first operating mode and control logic of causing the first hardware camera to be in the second operating mode.

12. The storage medium according to claim 11, wherein the processor is further configured to:
control the switching of the target camera between the first operating mode and the second operating mode based on a target strategy.

13. The storage medium according to claim 12, wherein the target strategy includes at least one of:
displaying a target image in a preview area of the target operating mode during a switch process between the logical camera and the first hardware camera;
performing no new switch instruction during the switching between the first operating mode and the second operating mode of the target camera;
after the target camera is switched from the second operating mode to the first operating mode, obtaining the target parameter by satisfying a target time length; or
starting the target application and obtaining the second image in the target operating mode based on the target camera in the second operating mode to obtain the target parameter by satisfying the time length.

14. An image acquisition method, comprising:
in response to a target application being in a target operating mode:
obtaining a first image by a target camera in a first operating mode;
obtaining a second image by the target camera in a second operating mode;
obtaining a target parameter, including:
in response to the target camera being in the second operating mode, obtaining an input operation, the resolution of the first image corresponding to the first operating mode being lower than the resolution of the second image corresponding to the second operating mode; and switching the target camera between the first operating mode and the second operating mode based on the target parameter, including:

in response to the input operation satisfying a target operation, switching the target camera from the second operating mode to the first operating mode, the target operation being capable of causing switching of a hardware camera.

15. An image acquisition method, comprising:

in response to a target application being in a target operating mode:

obtaining a first image by a target camera in a first operating mode;

obtaining a second image by the target camera in a second operating mode;

obtaining a target parameter; and switching the target camera between the first operating mode and the second operating mode based on the target parameter, including at least one of:

controlling a camera used in the target operating mode to be switched between a logical camera and a first hardware camera, wherein:

the target camera is the first hardware camera;

the logical camera corresponds to a plurality of hardware cameras;

the plurality of hardware cameras include the first hardware camera; and the logical camera includes control logic of causing the first hardware camera to be in the first operating mode; or controlling the first hardware camera to be switched between the first operating mode and the second operating mode based on the logical camera corresponding to the target operating mode, wherein:

the target camera is the first hardware camera;

the logical camera corresponds to the plurality of hardware cameras;

the plurality of hardware cameras include the first hardware camera; and the logical camera includes the control logic of causing the first hardware camera to be in the first operating mode and control logic of causing the first hardware camera to be in the second operating mode;

wherein a resolution of the first image and a resolution of the second image are different.

* * * * *